April 23, 1963  E. J. HERBENAR  3,086,801
SEALED LOADED JOINT ASSEMBLY
Filed Jan. 12, 1960  2 Sheets-Sheet 1

Inventor
Edward J. Herbenar
by Hill, Sherman, Meroni, Gross & Simpson
Attys.

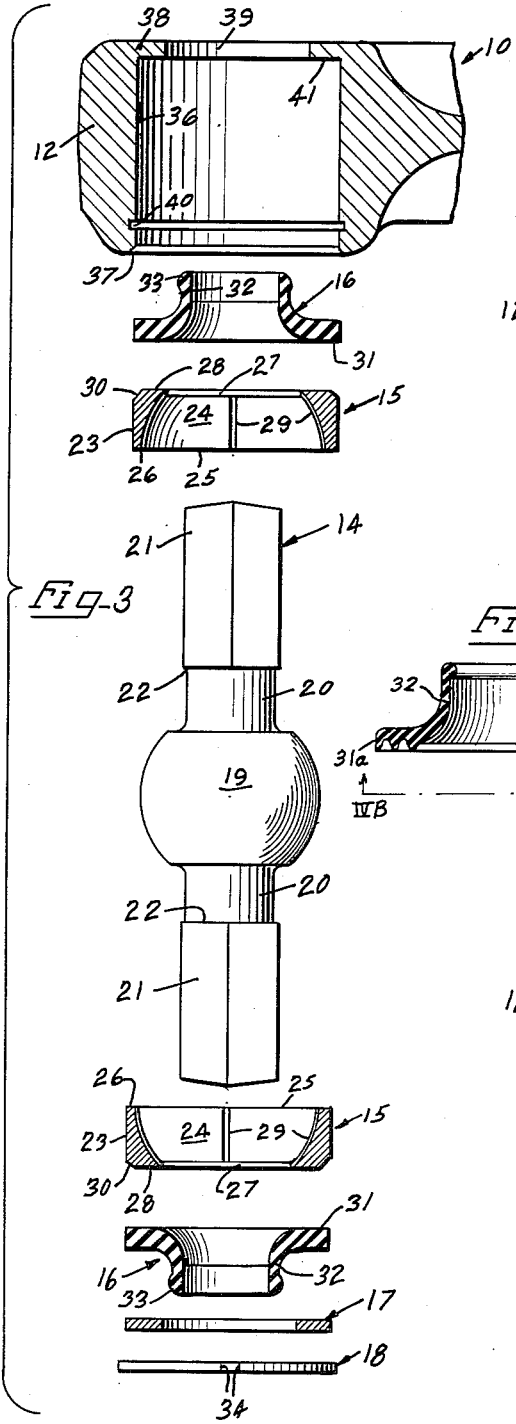
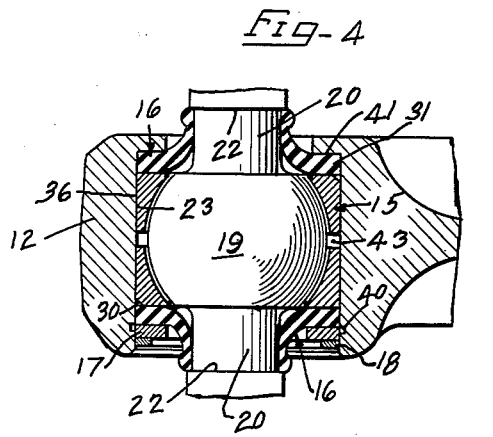
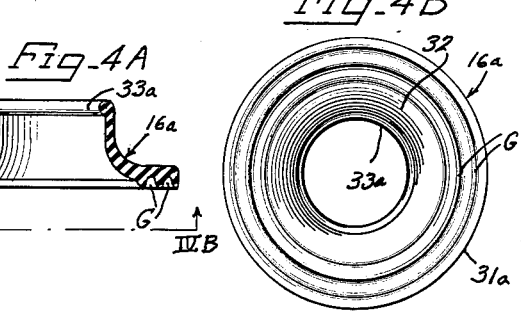
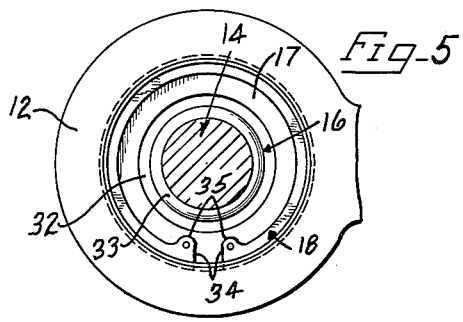

3,086,801
Patented Apr. 23, 1963

3,086,801
SEALED LOADED JOINT ASSEMBLY
Edward J. Herbenar, Detroit, Mich., assignor to Thompson Ramo Wooldridge Inc., Cleveland, Ohio, a corporation of Ohio
Filed Jan. 12, 1960, Ser. No. 2,050
5 Claims. (Cl. 287—90)

This invention relates to a joint assembly wherein lubrication is retained in the housing, dirt is excluded from the housing, and the joint components are urged into mated relation all by means of a resilient boot. Specifically this invention relates to ball joints having rubber dust seals which also function to maintain a load on the joint components for compensating against wear of the components during use of the joint.

While the invention will be specifically described as embodied in a ball joint of a radius rod, it should be understood that the principles of this invention are generally applicable to sealed joints and therefore the scope of the invention is not limited to the hereinafter specifically described preferred embodiment.

According to this invention the components of a ball joint are sealed in a housing and are maintained in proper mated together relationship by a combined sealing and loading dust cap or boot. This boot is composed of resilient material such as natural or synthetic rubber, plastics, or the like, which is deformable but relatively non-compressible. The boot is in the form of an annulus with an upstanding central collar. The collar terminates in a bead that tightly embraces a shoulder of the joint ball stud. The main body of the annulus is loaded between the bearing for the ball stud and the housing and in view of its tendency to assume its unloaded undeformed staus, it will exert a spring-like action on the bearing for maintaining the bearing in good engagement with the ball head of the stud.

A feature of the invention is the provision of a pocket between the periphery of the bearing ring and the housing for receiving a portion of the boot to take up any looseness that might develop between the bearing and the housing bore.

Another feature of the invention resides in the provision of a loading washer retained by a snap ring for determining the load placed on the rubber boot.

It is then an object of this invention to provide a joint assembly with a combined dust seal and loader for maintaining the joint components in proper bearing relation while simultaneously sealing the interior of the joint.

Another object of this invention is to provide a ball joint which will maintain its components in proper mated relation and will retain lubricant around the components without heretofore necessary separate spring loading and sealing units.

Another object of this invention is to provide a ball joint with the ball head of the joint stud supported in spaced opposed rigid bearing rings urged toward each other by a combined resilient dust cap and loading washer.

A further object of this invention is to provide a combined dust seal and loading device for joints.

A still further object of the invention is to provide a ball joint assembly having a stud with a central ball portion and opposed shank portions, with the ball portion seated in a pair of rigid bearing rings that are slidably mounted in the bore of a housing and having a pair of opposed rubber members tightly embracing the shanks of the ball stud and deformed against the bearing rings for urging the rings toward each other while simultaneously sealing the housing.

Another object of this invention is the provision of grooves in the dust seal to accommodate further deformation of the resilient material under axial load and thereby increase the stack-up tolerance of the joint components in the housing.

Other and further objects of this invention will be apparent to those skilled in this art from the following detailed description of the annexed sheets of drawings which, by way of a preferred illustration shows one embodiment of the invention.

On the drawings:

FIGURE 3 is an exploded cross sectional view with parts in elevation, showing the components of the joint prior to assembly;

FIGURE 4 is a vertical cross sectional view of the assembled joint components in the joint housing prior to loading the components;

FIGURE 4A is a vertical cross sectional view of a modified form of dust seal for the joint of FIGS. 1 to 4;

FIGURE 4B is a plan view of the seal of FIG. 4A along the line IVB—IVB of FIG. 4A; and FIGURE 5 is a horizontal cross section, with parts in elevation, along the line V—V of FIG. 2.

As shown on the drawings:

Figure 1:
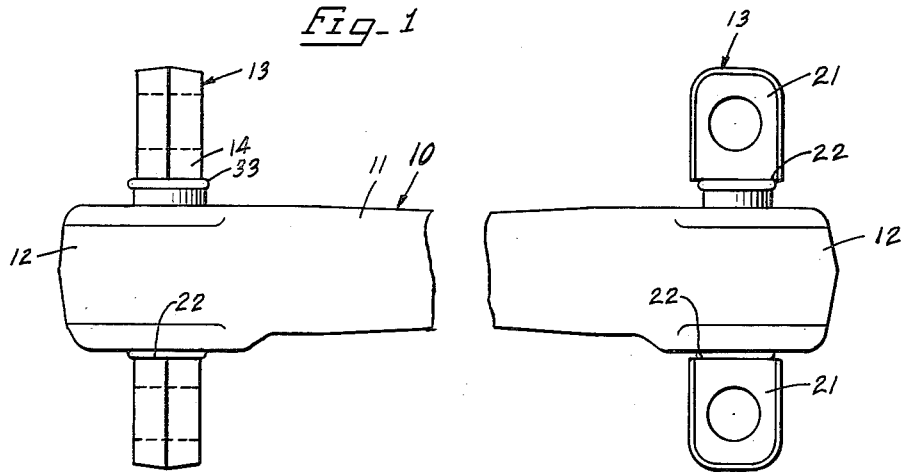
FIGURE 1 is a broken side elevational view of a radius rod equipped with joint assemblies of this invention.

In FIG. 1 the reference numeral 10 designates generally a radius rod for a truck or the like. The radius rod 10 has an elongated rod-like metal body 11 with eye ends 12, 12. Ball joint assemblies 13, 13 are provided at the ends 12, 12.

Each ball joint assembly 13 includes, in addition to the eye end 12, a ball stud 14, a pair of metal or plastic bearing rings 15, a pair of rubber dust seals 16, a metal washer 17, and a metal snap ring 18. If metal rings 15 are used, materials such as hardened steels are useful. If plastic rings 15 are used, hard materials such as laminated phenolics (plies of canvas impregnated with phenol-formaldehyde resin), cast "Vulkollan" (poly-urethane resin) and the like are useful.

The ball stud 14 has a central ball head 19 with diametrically opposite cylindrical stud shanks 20 terminating in eye ends 21, the apertures of which are adapted to receive suitable mounting structure (not shown). Between the cylindrical shanks 20 and the adjacent ends 21 there are provided radial shoulders 22.

The bearings rings 15 have cylindrical outer walls 23 and fragmental spherical inner walls 24 converging from a large diameter opening 25 in one flat end face 26 to a small diameter central opening 27 in an opposite flat end face 28. Grease grooves 29 are provided in the fragmental spherical wall 24 to extend between the openings 25 and 27.

A bevel or chamfer 30 is provided between the end wall 28 and the cylindrical side wall 23.

The rubber dust seals 16 are annular and have relatively thick flat main body portions 31 and thinner upstanding cylindrical central collar portions 32 terminating in external beads 33. The collar portions 32 flex relative to the main body portions 31.

The modified dust seal 16a of FIGS. 4A and 4B is the same as the seal 16, and the same numerals have been used to designate identical portions, but the flat main body portion 31a thereof has a pair of concentric annular grooves "G" in the face thereof to seat on the bearing ring 15 and the collar portion 32 has an internal bead 33a instead of an external bead.

The metal washer 17 is a flat annulus having an internal diameter substantially larger than the diameter of the collar 32 and an external diameter sized for fitting in the housing 12.

The snap ring 18 is a flat split spring washer with a contracting gap 34 and inwardly projecting apertured ears 35 on opposite sides of the gap adapted to receive a tool for contracting the washer to fit into the housing 12 and to then expand into an internal groove of the housing.

The housing 12 has a straight cylindrical bore 36 extending from a large diameter open end 37 to an inturned flange 38 surrounding a smaller opening 39 in the opposite end of the housing. An internal groove 40 is provided in the bore 36 adjacent the large open end 37. The flange 38 provides a flat radial shoulder 41 at one end of the bore while the groove 40 is provided at substantially the other end of the bore.

The bearing rings 15 fit around the ball head 19 of the stud on opposite sides of the major diameter of the ball and their openings 27 freely receive the cylindrical shanks 20 therethrough so that the stud can tilt and rotate in the rings. The rings have a sliding fit in the bore 36 of the housing with their cylindrical walls 23 affording good bearing contact with the bore. Since the rings 15 are composed of metal or other rigid material, the ball head 19 is centered in the housing 12 and cannot shift laterally relative thereto because of the bearing engagement between the head of the stud and the bearing rings and between the bearing rings and the rigid bore of the housing.

The dust seals 16 are stretched over the ends 21 of the stud and have the beads 33 thereof sealingly engaged against the shoulders 22 while the collars 32 surround the cylindrical shank portions 20 and diverge therefrom to the main body portion 31. These main body portions 31 overlie the end faces or walls 28 of the bearing rings. These main body portions 31 have an external diameter sized for fitting in the bore 36 and the outer peripheral portions of the main body will therefore overlie the chamfers 30.

One main body portion 31 of a dust seal 16 is bottomed against the shoulder 41 provided by the end flange 38 of the housing 12 while the other main body portion of the other seal receives the metal washer 17 thereagainst.

Figure 2:
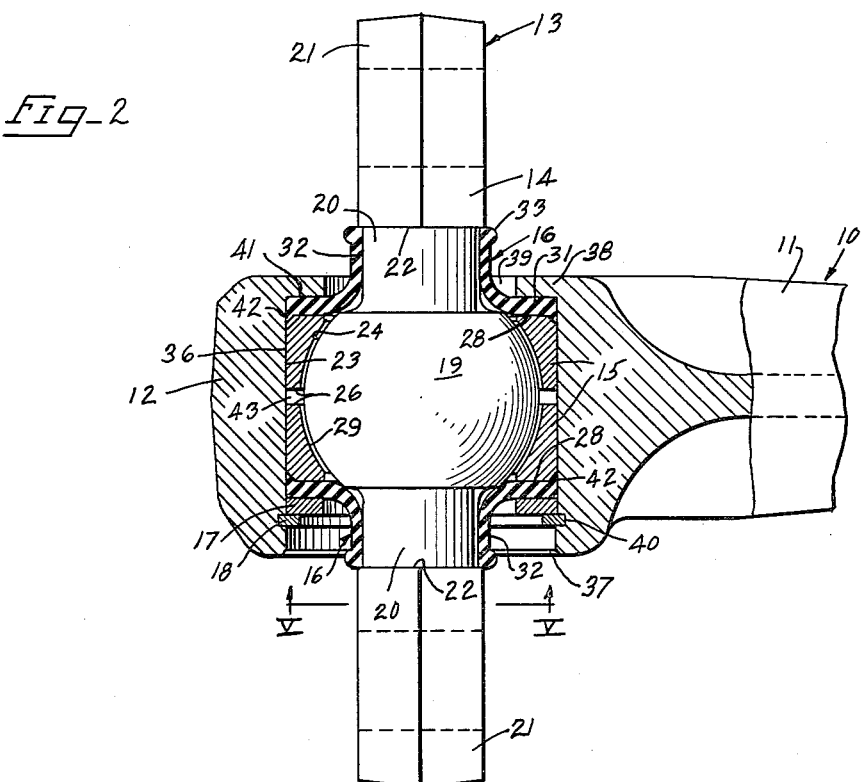
FIGURE 2 is an enlarged vertical cross section, with a part in elevation, of the joint of this invention.

As shown in FIG. 4 when the joint components are stacked in assembled relation in the housing 12, the axial dimension of the stack is longer than the distance between the shoulder 41 and the groove 40 so that end load must be applied on the stack for deforming the main body portions 31 of the dust seals 16 to accommodate a decrease in the height of the stack sufficient to permit alignment of the snap ring 18 with the groove 40 in order that the snap ring may expand into the groove and retain the washer 17. As shown in FIGURE 2, this deformation of the main body portions 31 is accommodated by interparticle flow of the rubber since rubber is relatively non-compressible and some of the rubber will flow into the space provided by the chamfers 30 forming rims or beads 42 acting as wedges to insure snug fit between the rings 15 and the bore 36. At the same time the deformed main body portions, in tending to reclaim their thicker free state, will exert axial loads on the bearing rings 15 urging them toward each other to decrease the gap 43 provided therebetween. In this manner the main bodies 31 act as springs to urge the bearing walls 24 of the bearing rings against the ball head 19 and to prevent looseness from developing between the walls 23 of the bearing rings and the bore 36.

The spring load on the bearing rings 15 can be varied to suit conditions by variations in the thickness of the washer 17 or by adding washers.

The stiffness of the load can be varied by varying the size of the opening 39 and the hole through the washer 17 thereby varying the exposed portions of the rubber bodies 31 and the resistance to interparticle flow of the rubber.

Increased stack-up tolerances can be accommodated with the modified dust seals 16a of FIGS. 4A and 4B because the grooves G will accommodate flow or rubber therein from the bodies 31a and these bodies can thereby assume thinner dimensions. The increased possible deformation of the portions 31a of the seals clamped between the rings 15 and the shoulder 41 or washer 17 will increase the range of permissible stack-up variations.

The internal beads 33a of the seals 16a space the collars 32 outwardly from the shanks 20 to accommodate variations in collar diameters without binding the collars on the shanks.

Since the beads 33 or 33a on the collars 32 tightly seal against the shoulders provided on the stud shanks, the interior of the joint housing is effectively sealed and grease packed in the joint will not leak out of the joint nor will extraneous matter be permitted to enter the joint. Since, however, the collar 32 only loosely embraces the cylindrical shank 20 while the effective seal is between the bead 33 and the radial shoulder 22, rotation of the stud inside of the seal is not impeded. As explained above, the collar 32 is flexible and may be rather limp to accommodate free tilting of the stud.

If desired, joints of this invention can be made with only one stud shank and one end of the housing closed by a plate whereby a single dust seal will provide the wear take-up.

The joint components can be easily replaced by removal of the snap ring 18.

If desired a grease fitting (not shown) can be threaded into the housing 12 to distribute lubricant to the gap 43 between the rings 15 and thence through the grease grooves 29 of the rings to all bearing surfaces or, alternatively, the gap 43 and grooves 29 can be initially packed with lubricant in a greased for life assembly. Flexing of the collar 32 of the sealing boot 16 will exert somewhat of a pumping action on grease in the joint for better circulation of lubricant.

From the above description it should therefore be understood that this invention now provides an inexpensive ball joint assembly with wear takeup and seal features that are provided by dual functioning resilient boots or dust caps.

I claim as my invention:

1. A ball joint assembly which comprises a housing having a cylindrical bore extending inwardly from an internally grooved open end to a radial shoulder at the other end thereof defining a reduced diameter opening, a stud having a central ball head and diametrically oppositely projecting cylindrical shanks with enlarged eye ends providing radial shoulders between the cylindrical shanks and ends, a pair of spaced opposed rigid bearing rings receiving the shanks freely therethrough and having fragmental spherical internal bearing walls receiving the ball head together with cylindrical peripheral walls snugly slidable in the cylindrical bore of the housing, said bearing rings having flat outer faces surrounded by chamfered portions extending to the cylindrical peripheries thereof, resilient boots having thick radial main body portions overlying the flat faces of the bearing rings and flexible collars surrounding the cylindrical shanks with beads on the ends thereof sealingly seated against said radial shoulders of the said shanks, one main body portion of a boot being bottomed against said shoulder of the housing, a rigid washer overlying the main body of the other boot in said bore of the housing, and a snap ring in said internal groove of the housing overlying said washer, the stacked height of the boots, rings and washer being greater than the distance between said shoulder of the housing and said internal groove whereby the snap ring is seated in said groove and operates to deform the boots and axially load the bearing rings on the ball head of the stud while flowing some boot material into the chamfered portions of the bearing rings for preventing looseness between the bearings rings and bore of the housing, said collars of the boots fitting freely through the open ends of the housing to accommodate free tilting of the stud in the housing.

2. A ball joint assembly comprising a housing having a cylindrical bore with an inturned flange at one end defining a reduced diameter opening and an internal radial shoulder, an internal groove in said bore spaced from said shoulder, a ball stud having a ball head with diametrically opposed cylindrical shanks extending therefrom terminating in eye ends and having radial shoulders between the shanks and heads, a pair of spaced opposed bearing rings with cylindrical peripheries seated in said bore of the housing and internal fragmental spherical bearing walls embracing the ball head of the stud, resilient boots overlying the bearing rings and embracing the cylindrical stud shanks and terminating in sealing relation with the radial shoulders of the stud shanks, a snap ring seated in said internal groove in the bore, and a rigid spacer washer between the snap ring and the adjacent boot whereby the thickness of said spacer washer will determine the axial load on the boots for maintaining the bearing rings in bearing relation with the ball head.

3. A ball joint comprising a housing, a bearing including a bearing ring slidable in the housing, a ball stud having a ball head engaged with the bearing ring and tiltable in the bearing and a shank extending from the head freely through the bearing and housing, a radial shoulder on the shank, a resilient sealing boot having a portion axially confronting and engaged against the radial shoulder and having a body portion clamped between the bearing ring and housing, and groove means defining at least one axially opening groove opening between the body portion and the bearing ring with material from the body deformed into the groove by the clamping action to accommodate reduction in thickness of the body portion, the radial shoulder on the shank providing means for axially confining movement of the material deformed from the body portion to maintain the ball under more uniform resilient load by the clamped body portion, the axially opening groove being defined by a chamfered portion on a peripheral portion of said bearing ring and by an inner wall of said housing.

4. A ball joint assembly which comprises a housing having a cylindrical bore extending inwardly from an internally grooved open end to a radial shoulder at the other end thereof defining a reduced diameter opening, a stud having a central ball head and diametrically oppositely projecting cylindrical shanks with enlarged eye ends providing radial shoulders between the cylindrical shanks and ends, a pair of spaced opposed rigid bearing rings receiving the shanks freely therethrough and having fragmental spherical internal bearing walls receiving the ball head together with cylindrical peripheral walls snugly slidable in the cylindrical bore of the housing, said bearing rings having flat outer faces, resilient boots having thick radial main body portions overlying the flat faces of the bearing rings and flexible collars surrounding the cylindrical shanks with beads on the ends thereof sealingly seated against said radial shoulders of said shanks, said radial main body portions of the boots having axially opening grooves, one main body portion of a boot being bottomed against said shoulder of the housing, a rigid washer overlying the main body of the other boot in said bore of the housing, and a snap ring in said internal groove of the housing overlying said washer, the stacked height of the boots, rings and washer being greater than the distance between said shoulder of the housing and said internal groove whereby the snap ring is seated in said groove and operates to deform the boots and axially load the bearing rings on the ball head of the stud while displacing some boot material into the axial grooves for preventing looseness between the bearing rings and bore of the housing, said collars of the boots fitting freely through the open ends of the housing to accommodate free tilting of the stud in the housing.

5. The assembly of claim 2 further characterized by said boots each having a radial main body portion provided with axial groove with said snap ring operating to displace boot material into the groove when said snap ring is seated in said internal groove in the bore.

References Cited in the file of this patent
UNITED STATES PATENTS

| | | |
|---|---|---|
| 1,891,804 | Flumerfelt | Dec. 20, 1932 |
| 2,305,265 | LeTourneau | Dec. 15, 1942 |
| 2,350,482 | Venditty | June 6, 1944 |
| 2,365,552 | Hill | Dec. 19, 1944 |
| 2,396,491 | Chamberlain | Mar. 12, 1946 |
| 2,421,588 | Venditty | June 3, 1947 |
| 2,752,178 | Hoffman | June 26, 1956 |
| 2,772,104 | Thiry | Nov. 27, 1956 |
| 2,797,603 | McRae | Jan. 29, 1957 |
| 2,871,025 | Neher | Jan. 27, 1959 |